Patented Aug. 9, 1949

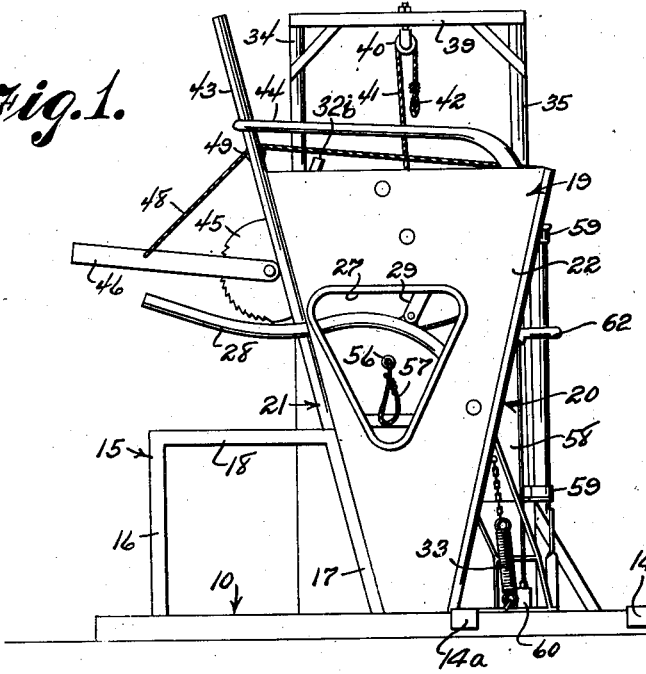

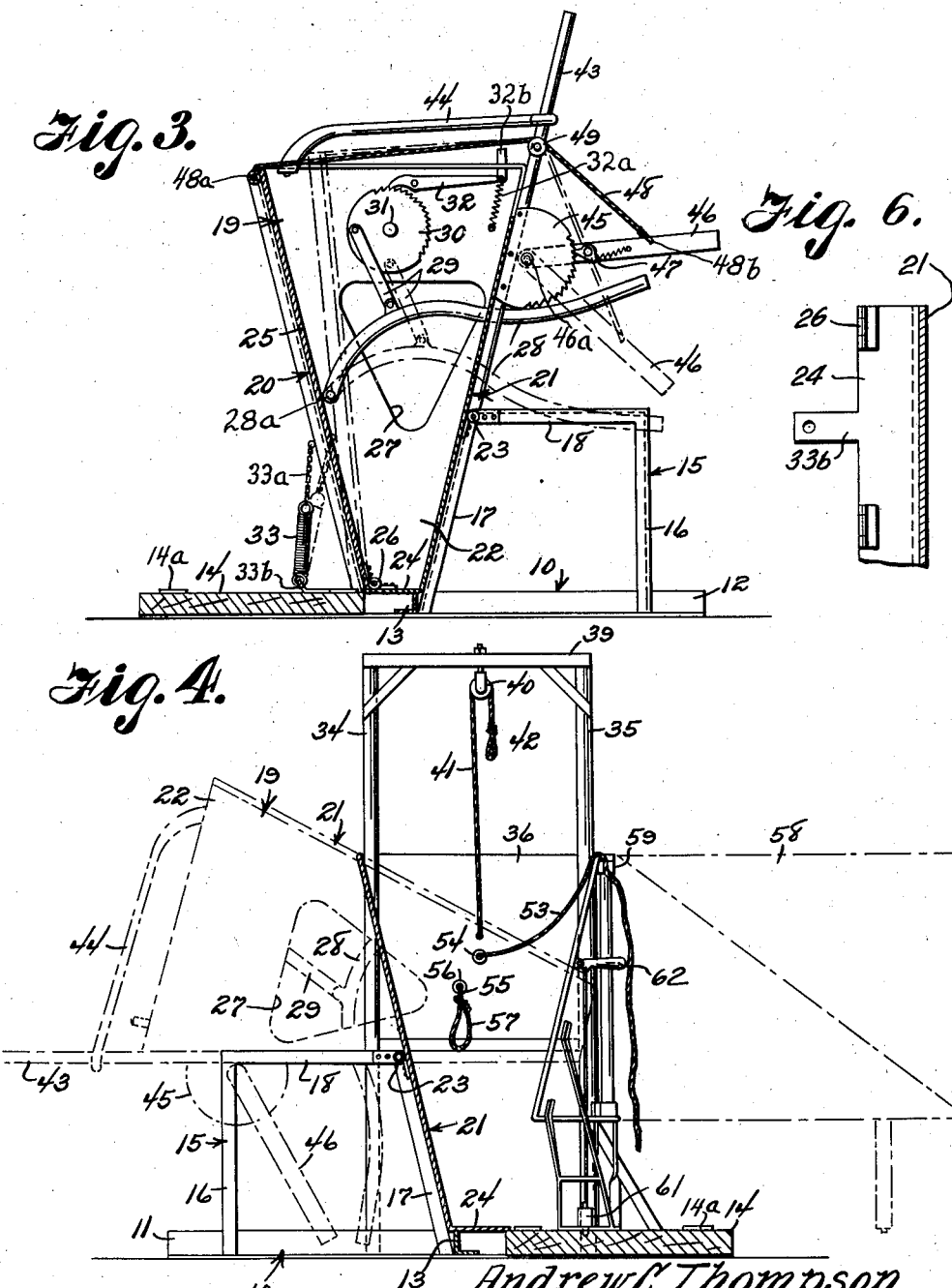

2,478,888

UNITED STATES PATENT OFFICE 2,478,888

RESTRAINING CHUTE FOR ANIMALS

Andrew C. Thompson and Carl Gill,
Madera, Calif.

Substituted for abandoned application Serial No. 387,538, April 8, 1941. This application May 28, 1943, Serial No. 488,906

3 Claims. (Cl. 119—98)

This invention relates to animal restraining devices, and more particularly to devices of this character especially adapted for holding calves while being branded, dehorned, castrated or the like.

The invention has for one of its objects to improve and simplify the general construction of animal restraining devices of the character stated and to provide one which will enable calves to be handled in a comparatively easy and highly efficient manner, which will be practically indestructible, and which may be manufactured and sold at a comparatively low cost.

With the foregoing and other objects in view, the nature of which will appear as the description proceeds, the invention resides in the construction, combination and arrangement of parts hereinafter fully described and claimed and illustrated in the accompanying drawings, wherein:

Figure 1 is a view in front elevation of an animal restraining device constructed in accordance with our invention.

Figure 2 is a view in side elevation of the device.

Figure 3 is a sectional view taken on the vertical plan indicated by the line 3—3 of Figure 2, looking in the direction indicated by the arrows.

Figure 4 is a sectional view taken on the vertical plan indicated by the line 4—4 of Figure 2, looking in the direction indicated by the arrows, the several parts of the stock being shown by dotted lines in the positions they occupy while the animal is being operated on, and Figure 5 is a sectional view taken on the horizontal plan indicated by the line 5—5 of Figure 2 looking in the direction indicated by the arrows.

Figure 6 is a detail showing a portion of the floor of the chute with parts broken away and parts omitted.

The animal restraning device comprises a base 10 which consists of rear and front cross bars 11 and 12, respectively, and a central longitudinal bar 13. The bars 11, 12 and 13 are made of angle-iron. The bar 13 is located between and has its ends secured to the bars 11 and 12. A platform 14 on which the operator stands, is located between and rests upon the cross bars 11 and 12 at one side of the longitudinal bar 13. Front and rear supports 15 which are located at the opposite side of the longitudinal bar 13, comprise outer legs 16, inner legs 17 and top bars 18. The legs 16 and 17 of the supports 18 have their lower ends secured to the cross bars 11 and 12, and the inner legs 17 of the supports occupy a downwardly and inwardly inclined position. The platform 14 is connected to the cross bars 11 and 12 by hooks 14a which are secured to the ends of the platform and which embrace the vertical flanges of these cross bars.

A stock 19 in which the animal is held while being operated on comprises side walls 20 and 21 and a front wall 22. The second side wall 20 and the front wall 22 are carried by the first side wall 21, and this wall is hinged, as at 23, to the supports 15 to permit the stock 19 to be swung from one of its positions to the other. The side wall 21 carries at its lower edge a floor piece 24, and the side wall 20 is hinged, as at 26, to the floor piece. The front wall 22 is fixed rigidly to the side wall 21, and it is provided with an opening 27 of triangular contour through which the neck of the calf in the stock extends.

When the stock 19 is in vertical position its side wall 21 rests against the inclined inner legs 17 of the supports 15 and its floor piece 24 rests upon the base bars 11, 12 and 13. When the stock is in this position, the side walls 20 and 21 occupy a downwardly converging relation. The side wall 20 is yieldingly held in this position by a spring 33 which is connected by a chain 33a to this side wall and which is connected to an arm 33b carried by the floor 24 from the lower edge of the side wall 21. The movement of the side wall 20 and the spring 33 is limited by a flange 22a carried by and extending rearwardly from the adjacent edge of the front wall 22.

The stock 19 is closed by a rear wall 36 forming a gate which is free of engagement with the walls 20, 21 and 22 and which is slidably mounted in a frame comprising uprights 34 and 35 and a top bar 39. The uprights 34 and 35 are secured at their lower ends to the rear cross bar 11 of the base 10 and are provided at their inner sides with grooves in which the side edges of the rear wall 36 are slidably mounted. The rear wall 36 is moved into its closed or opened position with relation to the stock 19 by means comprising a cable 41 which is secured at one end to this wall, which passes about a pulley 14 carried by the top bar 39 and which is provided at its other end with a hand loop 42.

With the stock 19 in vertical position, and with the rear wall 36 in raised position, the calf to be operated on is driven into the stock through the open rear end thereof. When its head projects through the opening 27 in the front wall 22, a lever 28 is moved into contact with the neck of the animal, whereby to prevent it from withdrawing its head from the opening. The lever 28 is pivoted, as at 28a, to the inner side of the front wall 22. The lever 28 is releasably held in contact with the animal's neck by means comprising a notched disk 30 rotatably mounted, as at 31, on the inner side of the front wall 22, a link 29 pivoted to the disk and lever, and a detent 32. The detent 32 is held in engagement with the notched disk 30 by a spring 32a. When the lever 28 is to be released, a fingerpiece 32b which is pivoted to the tail of the detent 32 is pressed downwardly, with the result that the detent is disengaged from the notched disk 30.

After the lever 28 is moved into and latched in contact with the neck of the calf, the side wall 20 is moved in the direction of the side wall 21 to clamp the animal within the stock 19. The side wall 20 is moved in the direction of the side wall 21 through the medium of means comprising a lever 46 pivoted, as at 46a, to a bar 43 fixed to the side wall 21, a cable 48 connected at one end, as at 48a, to the upper edge of the side wall 20 and connected at its other end, as at 48b, to the lever 46, a notched sector 45 fixed to the bar 43, and a spring pressed detent 47 carried by the lever and engaging the notched sector. A guide pulley 49 for the cable 48 is mounted on the bar 43.

The side wall 20 of the stock 19 is shorter than the side wall 21 so as to permit of ready access to the animal secured within the stock. A wall 58 extends from the side wall 20 to the upright 35 to close the rear portion of this side of the stock when the stock is in vertical or animal receiving position. The wall 58 is free of engagement with the wall 20, and it is mounted by hinges 59 upon the adjacent upright 35 so as to permit it to be swung outwardly and rearwardly away from the stock after the animal is secured within the stock, and thus permit of ready access to the animal. When the wall 58 is in closed position, the front end of the wall is supported by a bracket 60 which is fixed to the wall and which rests upon the platform 14. The wall 58 is secured in this position by a latch 61 which is mounted on the bracket 60 and which engages the platform 14. The latch 61 is moved into or out of engagement with the platform 14 by a lever 62 which is pivoted to the wall 58 and which is connected to the latch by a rod 63.

The feet of the animal within the stock are tied together through the medium of the loop end 57 a cable 53. This cable passes freely through an opening 54 in the rear wall 36 and is wound on a drum 51 which in turn is mounted upon a shaft 52 carried by a housing 50. The housing 50 is secured, as at 50a, to the outer side of the rear wall 36. A cable 55 for rotating the drum 51 is wound on a reduced extension of the drum and passes freely through an opening 56 in the rear wall 36. This cable passes over the upper edge of the wall 58 near the rear end of the stock 19 where it may be conveniently pulled to effect a rotation of the drum 51 in the act of tying the feet of the animal.

In practice, the device is made ready to receive the animal to be operated on by arranging the stock 19 in vertical position, latching the wall 58 in closed position, and raising the rear wall 36. After the animal has been driven into the stock 19, the rear wall 36 is lowered into closed position, and the lever 28 is swung downwardly into contact with the neck of the animal. The wall 58 is then swung into opened position. With this wall in this position the noose 57 may be readily engaged with the feet of the animal. The noose 57 is tightened about the feet by imparting movement to the drum 51 through the medium of the cable 55. The side wall 20 of the stock 19 is then moved in the direction of the side wall 21 through the medium of the lever 46. The animal is now firmly held within the stock 19 and may be conveniently branded or dehorned. Other operations may be performed by swinging the stock 19 into the horizontal position in which it is shown in Figure 4, the stock being supported in this position by the supports 15. The stock may be conveniently swung into this position through the medium of the upper end of the bar 43 which extends above the side wall 21, this end of the bar being reinforced by a brace 44 secured to the front wall 22 and to the bar.

This application is a substitute for application Serial No. 387,538 (now abandoned), filed April 8, 1941, for Restraining chute for animals.

We claim:

1. In an animal restraining device, a base, an animal receiving stock mounted on the base comprising a first side wall extending lengthwise of the stock, a front wall fixed to said side wall, a second side wall section extending rearwardly from the front wall and connected with the first side wall for movement therewith, said second side wall section being mounted for pivoted movement upwardly and inwardly with relation to the upstanding position of the first side wall, and a floor carried by the said first side wall and on which the said second side wall section is pivoted; and means on the base for supporting said first side wall for vertical tilting movement from its normal upstanding position to a horizontal position, an upstanding frame mounted on the base at the rear of the stock having a rear wall mounted for vertical sliding movement therein, a rear wall section which extends in the same direction as the front section of the said second side wall of the stock, and means pivotally connecting the rear end of said rear wall section with the frame whereby said rear wall section is adapted to swing horizontally from its normal stock forming position to an outwardly directed open position.

2. The device described in claim 1 including means yieldingly holding the second side wall section away from the first side wall, the front wall and the forward section of the second side wall normally being in upstanding position, and means for releasably holding the rear section of the second side wall in stock forming position.

3. In a stock handling device, a base structure, spaced, generally vertical, supports mounted thereon, a table mounted between and carried by said supports for tilting movement about a horizontal axis from an initial position, an animal supporting platform secured to the lower edge of said table and extending laterally therefrom, a clamping member spaced from said table and pivotally mounted adjacent the lower edge of said table and swingable toward and away from said table, a table supporting member adapted to support said table when the latter is in a final position, and means for successively swinging said clamping member toward the table to secure an animal and tilting the table to said final position.

ANDREW C. THOMPSON.
CARL GILL.

REFERENCES CITED

The following references are of record in the file of this patent:

UNITED STATES PATENTS

| Number | Name | Date |
|---|---|---|
| 134,707 | Scott et al. | Jan. 7, 1873 |
| 167,440 | Deatherage | Sept. 7, 1875 |
| 350,646 | Tiffany | Oct. 12, 1886 |
| 410,507 | Fain | Sept. 3, 1889 |
| 413,080 | Morris et al. | Oct. 15, 1889 |
| 545,415 | Schecher | Aug. 27, 1895 |
| 629,865 | Marshall | Aug. 1, 1899 |
| 730,049 | Sage | June 2, 1903 |
| 970,344 | Mills | Sept. 13, 1910 |
| 1,120,115 | Adair | Dec. 8, 1914 |
| 1,389,993 | Schulz | Sept. 6, 1921 |
| 1,799,073 | Thompson | Mar. 31, 1931 |
| 2,197,600 | Wimer | Apr. 16, 1940 |